United States Patent
Boom et al.

(10) Patent No.: US 10,028,515 B2
(45) Date of Patent: Jul. 24, 2018

(54) METHOD FOR PRODUCING A CYLINDRICAL MOULD MEMBER FOR MOULDING THREE- DIMENSIONAL PRODUCTS FROM A MASS OF ONE OR MORE FOOD STARTING MATERIALS

(71) Applicant: MAREL TOWNSEND FURTHER PROCESSING B.V., Boxmeer (NL)

(72) Inventors: Wilhelmus Gerardus Maria Boom, Maashees (NL); Johannes Martinus Meulendijks, Deurne (NL); Franciscus Quirinus Fredrik Verouden, Sint Anthonis (NL); Thomas Willem Dekker, Nijmegen (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 37 days.

(21) Appl. No.: 15/323,642

(22) PCT Filed: Jul. 2, 2015

(86) PCT No.: PCT/NL2015/050484
§ 371 (c)(1),
(2) Date: Jan. 3, 2017

(87) PCT Pub. No.: WO2016/003279
PCT Pub. Date: Jan. 7, 2016

(65) Prior Publication Data
US 2017/0156352 A1    Jun. 8, 2017

(30) Foreign Application Priority Data
Jul. 4, 2014 (NL) ...................................... 2013121

(51) Int. Cl.
*A22C 7/00* (2006.01)
*B29C 33/38* (2006.01)
(Continued)

(52) U.S. Cl.
CPC ............ *A22C 7/0069* (2013.01); *A23P 30/10* (2016.08); *B29C 65/1477* (2013.01);
(Continued)

(58) Field of Classification Search
CPC ... A22C 7/0069; A23P 30/10; B29C 33/0022; B29C 33/3814; B29C 65/1477;
(Continued)

(56) References Cited

U.S. PATENT DOCUMENTS 7,819,650 B2 * 10/2010 Meskendahl ........ A22C 7/0038
425/220
7,931,461 B2 * 4/2011 van der Eerden ... A22C 7/0038
425/363
(Continued)

FOREIGN PATENT DOCUMENTS

EP        2 064 956 A1    6/2009
WO       WO 00/30458 A1   6/2000
(Continued)

*Primary Examiner* — James P Mackey
(74) *Attorney, Agent, or Firm* — Birch, Stewart, Kolasch & Birch, LLP

(57) ABSTRACT

A rotary cylindrical mold member and a method for its production, is adapted to be used in a system for molding three-dimensional products from a mass of one or more food starting materials which are suitable for consumption. The method includes preparing at least one mold body forming part of the cylindrical outer surface of the mold member, wherein one or more recessed mold cavities are formed. Subsequently preparing a support member defining one or more fluid channels, recessed in the support surface Heat emitting parts or particles are provided close to the inner surface of the mold body and/or the supporting surface of the support member. Energy is provided to the heat emitting parts or particles, thereby causing the parts or particles to emit heat and thereby locally melt the adjacent porous first (Continued)

plastic and the second plastic to obtain a weld and thereby secure the support member and the mold body to each other.

20 Claims, 10 Drawing Sheets

(51) Int. Cl.
| | |
|---|---|
| *B29C 65/34* | (2006.01) |
| *A23P 30/10* | (2016.01) |
| *B29C 65/14* | (2006.01) |
| *B29D 23/00* | (2006.01) |
| *B29C 65/00* | (2006.01) |
| *B33Y 10/00* | (2015.01) |
| *B33Y 80/00* | (2015.01) |
| *B33Y 70/00* | (2015.01) |
| *B29L 23/00* | (2006.01) |
| *B29L 31/00* | (2006.01) |
| *B29C 33/00* | (2006.01) |

(52) U.S. Cl.
CPC ............ *B29C 66/61* (2013.01); *B29C 66/727* (2013.01); *B29D 23/00* (2013.01); *B29C 33/0022* (2013.01); *B29C 33/3814* (2013.01); *B29C 65/344* (2013.01); *B29C 65/3408* (2013.01); *B29C 65/3476* (2013.01); *B29L 2023/003* (2013.01); *B29L 2031/757* (2013.01); *B33Y 10/00* (2014.12); *B33Y 70/00* (2014.12); *B33Y 80/00* (2014.12)

(58) Field of Classification Search
CPC ... B29C 65/34; B29C 65/3408; B29C 65/344; B29C 65/3476
See application file for complete search history.

(56) References Cited

U.S. PATENT DOCUMENTS

| | | | |
|---|---|---|---|
| 8,469,697 B2* | 6/2013 | Lindee | .................. A22C 7/0038 |
| | | | 235/375 |
| 9,526,269 B2* | 12/2016 | van Doorn | ........... A22C 7/0069 |
| 9,730,467 B2* | 8/2017 | Van Gerwen | ........... A23P 30/10 |
| 2013/0259991 A1 | 10/2013 | Lindee et al. | |
| 2013/0337128 A1 | 12/2013 | Van Gerwen et al. | |

FOREIGN PATENT DOCUMENTS

| | | |
|---|---|---|
| WO | WO 2004/002229 A2 | 1/2004 |
| WO | WO 2005/107481 A2 | 11/2005 |

* cited by examiner

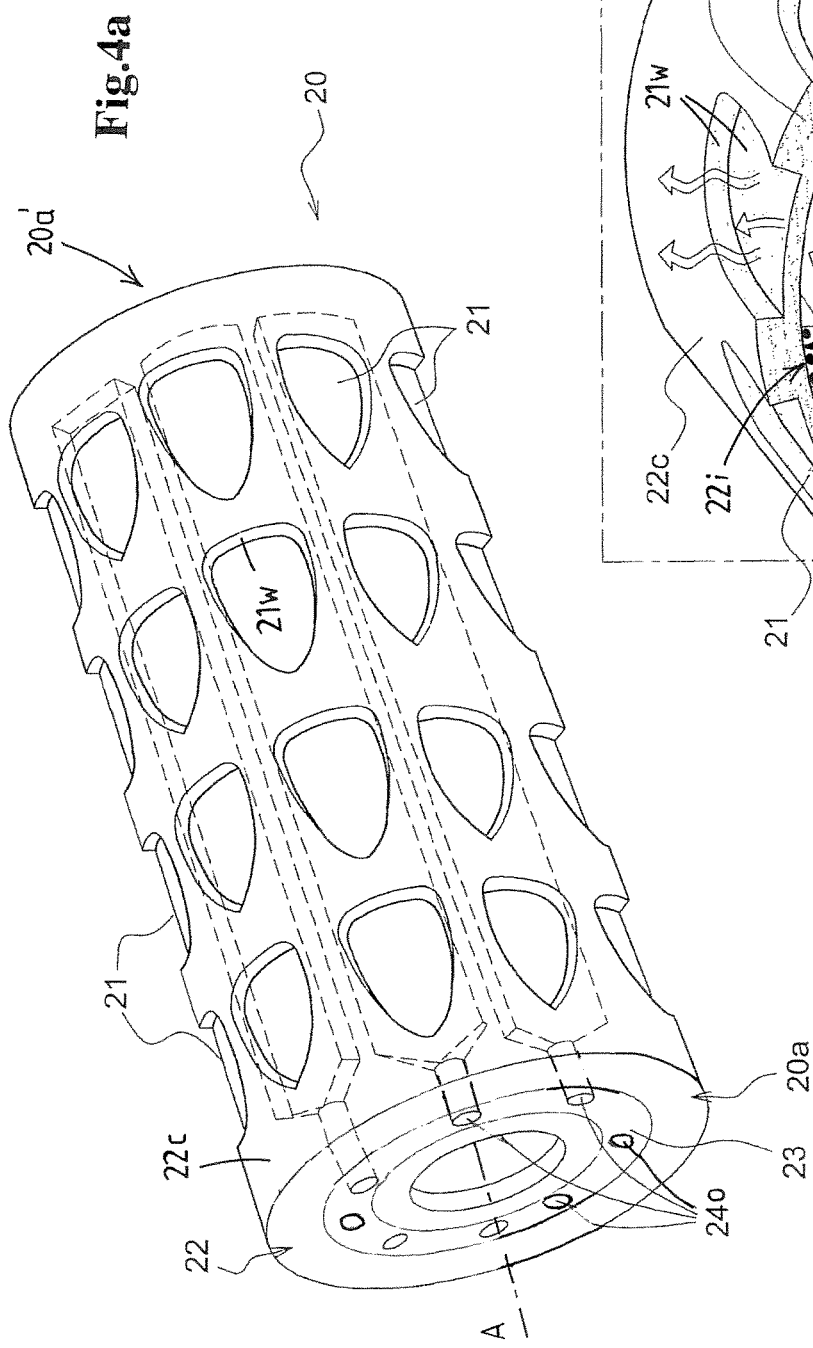
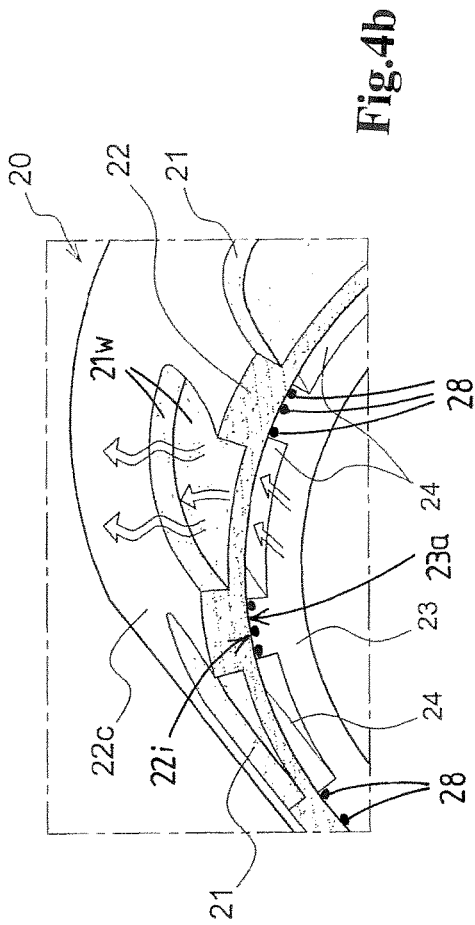

METHOD FOR PRODUCING A CYLINDRICAL MOULD MEMBER FOR MOULDING THREE- DIMENSIONAL PRODUCTS FROM A MASS OF ONE OR MORE FOOD STARTING MATERIALS

The present invention relates to a method for producing a cylindrical mould member according to the preamble of claim 1, which is adapted to be used in a system for moulding three-dimensional products from a mass of one or more food starting materials which are suitable for consumption, the cylindrical mould member having a cylindrical outer surface and two mould member end faces.

Such a method is well known to the applicant, e.g. from the applications WO00/30458 and WO2004002229, disclosing cylindrical mould members provided with recesses into which inserts can be secured, by means of bolts or other attachment means.

In view of costs, it is advantageous to apply a plastic mould member, comprising a mould body made at least partially from a porous first plastic and a support member of a non-porous second plastic, as this is cheaper than metal mould bodies. Because plastic is inherently weaker than metal other production considerations and challenges apply. In particular, producing the mould member from both a porous plastic mould body and a plastic support member requires a firm connection between the parts. The known connections were not satisfactory.

The aim of the present invention was to provide an improved connection between a plastic support member and mould body.

This aim is achieved according to the invention by the steps of:
providing heat emitting parts or particles close to the inner surface of the mould body and/or the supporting surface of the support member;
providing energy to the heat emitting parts or particles, thereby causing the parts or particles to emit heat and thereby locally melt the adjacent porous first plastic and the second plastic to obtain a weld and thereby secure the support member and the mould body to each other.

Accordingly, the support member and the mould body are secured to each other via a weld. A thus obtained weld provides a very strong connection between support member and mould body, thereby forming a cylindrical mould member adapted to be used in a system for moulding three-dimensional products from a mass of one or more food starting materials which are suitable for consumption.

An advantage of a thus obtained cylindrical mould member is that the weld is adapted to withstand a force applied by a mass feed part, which force may add up to thousands of kilos. Hence, the support member reliably supports the mould body with the one or more mould cavities, allowing the cylindrical mould member in a number of production cycles to mould the three-dimensional products.

According to the invention, the weld is achieved by locally melting plastics. The melting is caused by local heating, which heat is emitted by the heat emitting parts or particles. Accordingly, not the entire mould member is heated.

Advantageously, the heat emitting parts or particles have a low specific heat capacity, i.e., little energy is required to rapidly increase the temperature of the particles, and hence cause the emission of heat. Advantageously, the heat emitting parts or particles have a high heat transfer coefficient, allowing fast transfer of thermal energy through the parts or particles.

Heat transfer from the heat emitting parts or particles to the first and second plastic occurs via conduction: the transfer of thermal energy through materials without bulk motion of the materials. This phenomenon is fundamentally a diffusion process that occurs at the microscopic level.

Energy is provided to the heat emitting parts or particles to cause them to emit heat. This energy can be provided e.g. via radiation, e.g. by applying electromagnetic radiation, e.g. microwave radiation, e.g. by a laser. Yet alternatively, energy can be provided to the heat emitting part or particles by allowing electrical current to pass through the heat emitting parts or particles. Yet alternatively, energy is provided to the heat emitting part or particles by allowing Eddy currents to pass through the heat emitting parts or particles, thereby causing induction heating.

The energy may also be provided to the heat emitting parts or particles by heat conduction, i.e. by heating up an end piece of the heat emitting parts, protruding beyond the plastic parts to be welded, and allowing the heat to dissipate throughout the heat emitting parts.

Yet alternatively, the heat emitting parts may be provided with energy via convection. For example, a heat emitting tube is provided close to the inner surface of the mould body and/or the supporting surface of the support member, through which a heated fluid is allowed to flow, causing the porous first plastic and the second plastic to locally melt so as to obtain a weld. Convection is concerned with the transfer of thermal energy in a moving fluid, in particular liquid or gas. In such an embodiment, a fluid flow device should additionally be provided, e.g. a fan to allow heated gas to flow.

Advantageously, the melting point of the heat emitting parts or particles is higher than that of the second plastic of the support member and the first plastic of the mould body, allowing heat emission over the entire part or particle without melting itself. This is in particular disadvantageous when energy is provided to the parts or particles by conduction, as the conductivity of molten parts or particles may decrease rapidly.

Advantageously, the heat emitting parts or particles are made from metals. Preferably, conductive metals, such as iron or copper-based alloys are applied. Yet alternatively, semiconductors can also be applied.

In embodiments, the heat emitting parts are metal strips or wires, provided at or near the support surface of the support member, and wherein preferably the support surface is provided with grooves to receive the metal strips or wires.

In alternative embodiments, the heat emitting parts is a porous film/braid/mesh/wire screen, e.g. made from metal, provided between the inner surface of the mould body and the supporting surface of the support member.

In alternative embodiments, the support surface of the support member and/or the inner surface of the mould body is doped with heat emitting particles, e.g. metal particles. Yet alternatively, the support surface of the support member and/or the inner surface of the mould body is provided with heat emitting foil inserts, e.g. metal foil inserts.

It is conceivable that additional measures are provided to secure the mould body and support member to each other. For example, a form fit may be provided. Also additional gluing may be applied, or mechanical connection devices such as bolts.

In embodiments, it is well conceivable that during or after the provision of energy to the heat emitting parts or particles, pressure is applied to the support member and mould body during, to improve weld formation.

In embodiments, the mould body is formed as a hollow cylinder wall, and wherein the support member is formed by a cylinder fitting into the hollow cylinder wall. With a hollow cylinder wall a cylindrical body is meant, comprising an outer surface at an outer diameter and an inner surface at an inner diameter, having a certain thickness between the outer and inner surfaces. The diameter of the cylindrical support member essentially corresponds to the inner diameter of the cylinder wall.

In alternative embodiments, the support member is provided with one or more recesses, and the mould bodies are formed as inserts of corresponding dimensions, e.g. as cylindrical wall segments. Advantageously, the support member comprises one or more protruding support fins, having a curved surface that forms part of the cylindrical outer surface of the mould member and adjacent flank surfaces, and wherein multiple mould bodies are provided comprising a side surface between the curved outer surface and the inner surface, wherein a flank surface of the support fin is adapted to be provided adjacent a side surface of a mould body when the support surface of the support member is provided adjacent the inner surface of the mould body, and wherein preferably heat emitting parts or particles are also provided close to the side surface of the mould body and/or the flank surface of the fin of the support member.

According to the invention, the at least one mould body is made at least partially from a porous first plastic, and the support member from a non-porous second plastic. In embodiments, the support member is originally made from a porous plastic, optionally the same plastic as the mould body, which porous plastic has been made non-porous. A common production technique for plastic products is injection moulding. In embodiments, at least the mould body, and possibly also the support member, is prepared by a 3D printing technique. The mould body and the support member are for example made of a similar kind of plastic material, preferably UHMW-PE or PTFE.

In embodiments, at least the porous mould body, is prepared by a sintering technique. A 3D printing technique is also suitable to prepare porous plastics. Advantageously, the dimensions of pore openings are such that no or scarcely any of the mass of one or more food starting materials can pass through, and such that no sticking of the food mass into the pore openings occurs. A porous structure according to the present invention can also be obtained by providing through-holes in a mould body.

In embodiments, the mould body is a composite, partially made from a porous first plastic. Alternatively, the mould body is of a monolithic, one-piece structure. Advantageously, the support member is also of a monolithic, one-piece structure.

According to the invention, at a mould member end face one or more fluid openings are provided, from which one or more fluid channels, recessed in the support surface of the support member, extend. The fluid channels advantageously extend in the longitudinal direction of the mould member. Alternatives are also conceivable, e.g. the fluid channels forming a helical or spiral pattern between the two mould member end faces.

Adjacent this support surface, the porous mould body is provided. It is conceivable that only one, or multiple fluid channels adjoin the porous mould body. As a result, a fluid communication is provided between the mould cavity and the mould member end face. As a result, fluid may be fed to or from the mould cavities. The fluid may be a gas or liquid.

For example, air is fed or forced to the porous mould cavity walls to assist in the removal of product from the mould cavity, or cleaning liquid to assist in cleaning the porous mould cavity walls. It is also conceivable that fluid is removed from the mould cavities, e.g. a vacuum is created in the mould cavity to ensure proper filling of the mould cavities, reducing the risk of air inclusions.

In order to obtain these advantages, it is important to obtain fluid tight regions in the mould body in which one or more mould cavities are provided. At least, according to claim 1, the curved outer surface of the mould body is sealed airtight.

In embodiments comprising multiple recessed mould cavities in a mould body, the mould body is advantageously provided with fluid tight barriers between each mould cavity or set of mould cavities, which fluid tight barriers extend between the curved outer surface and the opposite inner surface, creating one or more fluid tight regions in the mould body in which one or more mould cavities are provided.

In embodiments, the fluid tight barriers extend in the longitudinal direction of the mould member, advantageously parallel to fluid channels also extending in the longitudinal direction.

The present invention also relates to a cylindrical mould member adapted to be used in a system for moulding three-dimensional products from a mass of one or more starting materials which are suitable for consumption, e.g. a meat mass, the cylindrical mould member having a longitudinal axis, a peripheral cylindrical outer surface and two axial mould member end faces, the mould member comprising:

at least one mould body having a curved outer surface, forming at least part of the cylindrical outer surface of the mould member and an opposite inner surface, which mould body is made at least partially from a porous first plastic, forming a porous structure of intercommunicating pores opening out at the inner surface of the body, and wherein the curved outer surface of the mould body is sealed airtight; wherein one or more recessed mould cavities are formed in the outer peripheral cylindrical surface of the mould body, defining the shape of the products which are to be produced, the mould cavities being open in the outer surface of the mould body to allow for the filling of the mould cavity with said mass of one or more food starting materials and being defined by a mould cavity wall that is at least partially porous; and a support member made from a non-porous second plastic, which support member has a support surface, which support member defines one or more fluid channels recessed in the support surface, extending from a fluid opening at a mould member end face, adapted to provide fluid communication between the fluid opening via the fluid channel and via the pores opening out at the inner surface of the mould body to the porous mould cavity wall, whereby the support member and the mould body are secured to each other using a method according to one or more of the claims.

The present invention also relates to a system for moulding three-dimensional products from a mass of one or more food starting materials which are suitable for consumption, which system comprises:

a cylindrical mould member according to one or more of the claims;

a production device comprising:
   a frame that is adapted to support the mould member,
   a drive for driving the mould member that is supported by the frame, a container for receiving said mass of one or more food starting materials, a pump connected to the container, a mass feed member connected to the pump, wherein the mass feed member is adapted to bear against the cylindrical outer surface of the mould member, a fluid forcing device, a fluid supply member connected to the fluid forcing device, wherein the fluid supply member is adapted to bear against the end face of the mould member from which the one or more fluid channels extend.

The invention is further elucidated in relation to the attached drawings, wherein:

FIG. 1 shows in a diagrammatically perspective view an embodiment of a system for moulding including a production device, according to the invention;

FIG. 2 depicts in a diagrammatically perspective view a part of the production device with mould member, and conveyor means for the mould member of FIG. 1, FIG. 3 depicts in a diagrammatically perspective view the production device and an associated cleaning device from FIG. 1, FIG. 4a shows in a schematic perspective view a first embodiment of a mould member according to the invention, FIG. 4b shows a cross section through a part of the mould member of FIG. 4a, FIG. 5 depicts in a diagrammatically perspective view a part of the production device with mould member of FIG. 2;

FIG. 6a shows in a schematic perspective view a support member of a second embodiment of a mould member according to the invention, FIG. 6b shows a detail of a part of the support member of FIG. 6a, FIG. 7 shows a cross-sectional view of a third embodiment of a mould member according to the invention, FIG. 8a shows in cross-section a portion of a fourth embodiment of a cylindrical mould member, prior to assembly of the mould body and support member;

Figure 1:
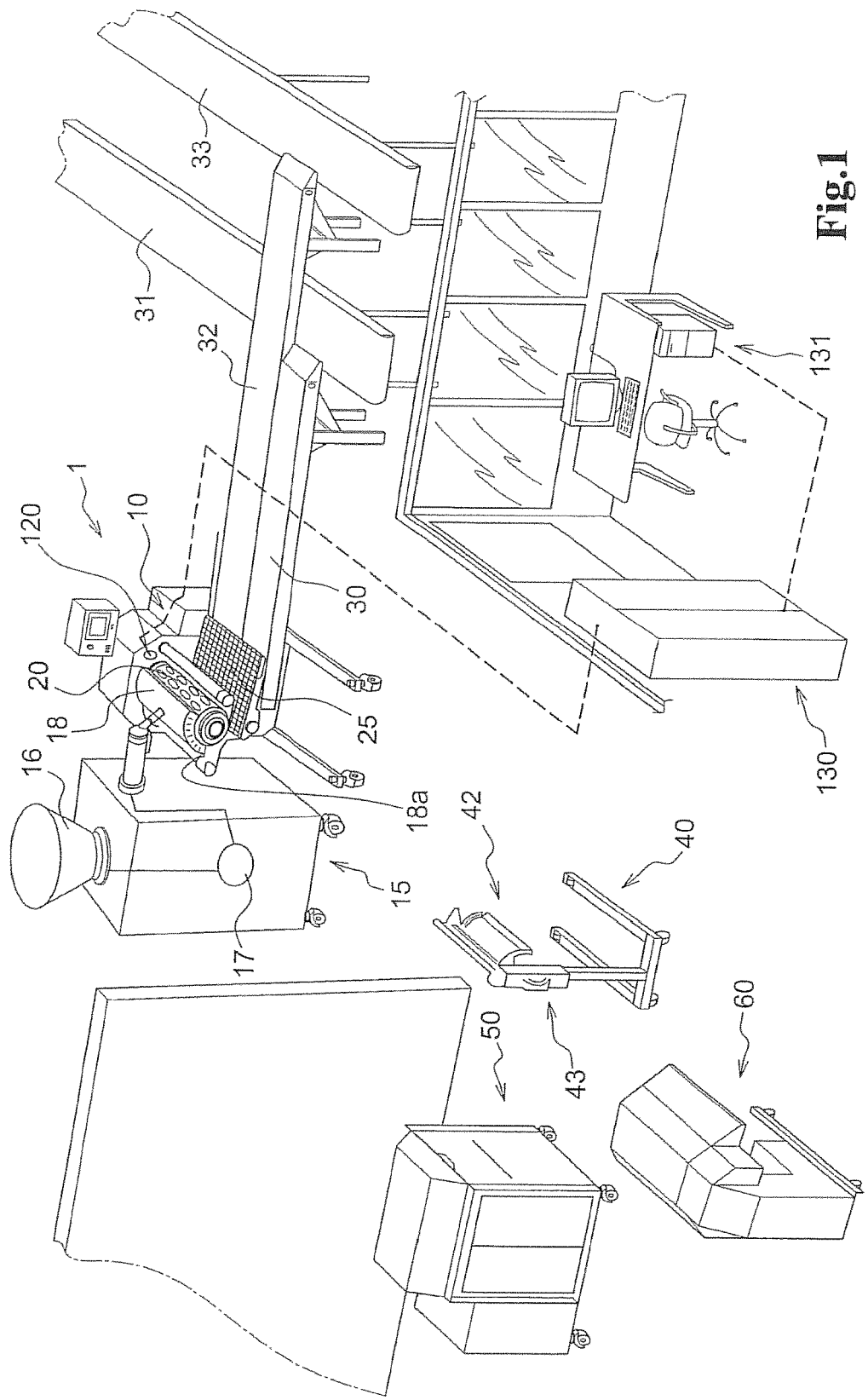

In FIG. 1, a production device 1 is shown for moulding three-dimensional products from a mass of one or more food starting materials which are suitable for consumption, e.g. a meat mass. Such a production device is described in detail in WO 2004/002229, the contents of which are hereby deemed to be incorporated in the present application. The production device shown is only an example aimed at explaining the invention. The invention can also be realized using production devices of different designs, for example as shown in WO 00/30458.

In the production device 1, use is made of a cylindrical mould member 20 according to the present invention. The mould member 20 has a peripheral cylindrical outer surface in which one or more recessed mould cavities 21 are formed, as will be explained in more detail below.

The production device 1 comprises a frame 10 that is adapted to support the mould member, in this case a frame 10 which can be moved over the floor. The frame 10 as shown is provided with a horizontal mould member fitting spindle 11, so that the mould member 20 is rotatable with respect to the frame 10 about the spindle 11. In an embodiment which is not shown, the frame may have a plurality of mould member fitting spindles, or the frame comprises other support means for supporting the mould member rotatably with respect to the frame. At one end, the fitting spindle 11 is fixed to the frame 10, so that the mould member 20 can be pushed onto the fitting spindle 11. Advantageously, as in the shown embodiment, the mould member is removable from the frame, here via the free end of the spindle. Possibly, the spindle is made of plastic material, preferably UHMW-PE or PTFE, preferably a similar material as the mould body, and possibly also as the support member. It is also conceivable that the spindle is made from another material, in particular metal, e.g. stainless steel.

Furthermore, the frame 10 is provided with a drive 14 for rotating the mould member 20 that is rotatable supported by the frame 10 via spindle 11.

Furthermore, the shown production device 1 has a mass feed part 15, which is likewise designed such that it can be moved over the floor, and is provided with a container 16 for receiving said mass of food starting materials, in this example a (kneaded) meat mass, e.g. chicken, a pump 17 (illustrated highly diagrammatically) connected to the container for pumping the mass, and a mass feed member 18 connected to the pump 17. At a mass feed position, the mass feed member 18 is allowed to bear against the cylindrical outer surface of the mould member 20. In operation of the production device 1 the drive 14 drives the mould member 20 that is supported by the frame 10 so that the one or more openings of the mould cavities 21 pass the mass feed member 18 and the pump 17 feeds the mass of one or more food starting materials via the mass feed member 18 and the one or more passing openings into the one or more mould cavities 21 of the rotating mould member 20 under a filling pressure, thereby forming a three-dimensional product in each mould cavity. In this example, the mass feed member 18 is supported pivotably by means of a support spindle 18a on the frame 10.

Here, the frame 10 is also provided with a discharge member 25 for discharging the moulded products, in this case in the form of a (mesh) belt conveyor 25 which extends as far as beneath the mould member 2, so that products which have been ejected from the mould cavities 21 in the region of the underside of the belt pass onto the said belt conveyor 25.

The system comprises further product conveyor means, in this case two sets of belt conveyors 30, 31 and 32, 33, for discharging moulded products, if appropriate to further product treatment devices.

In the shown embodiment, as indicated above, the mould member 20 is removable. For this purpose, in FIGS. 1-2 a mould member conveyor 40 is provided. This conveyor 40, shown by way of example, has a movable frame 41, a mould member gripper 42 and lifting means 43 for moving the gripper 42 up and down.

Figure 2:
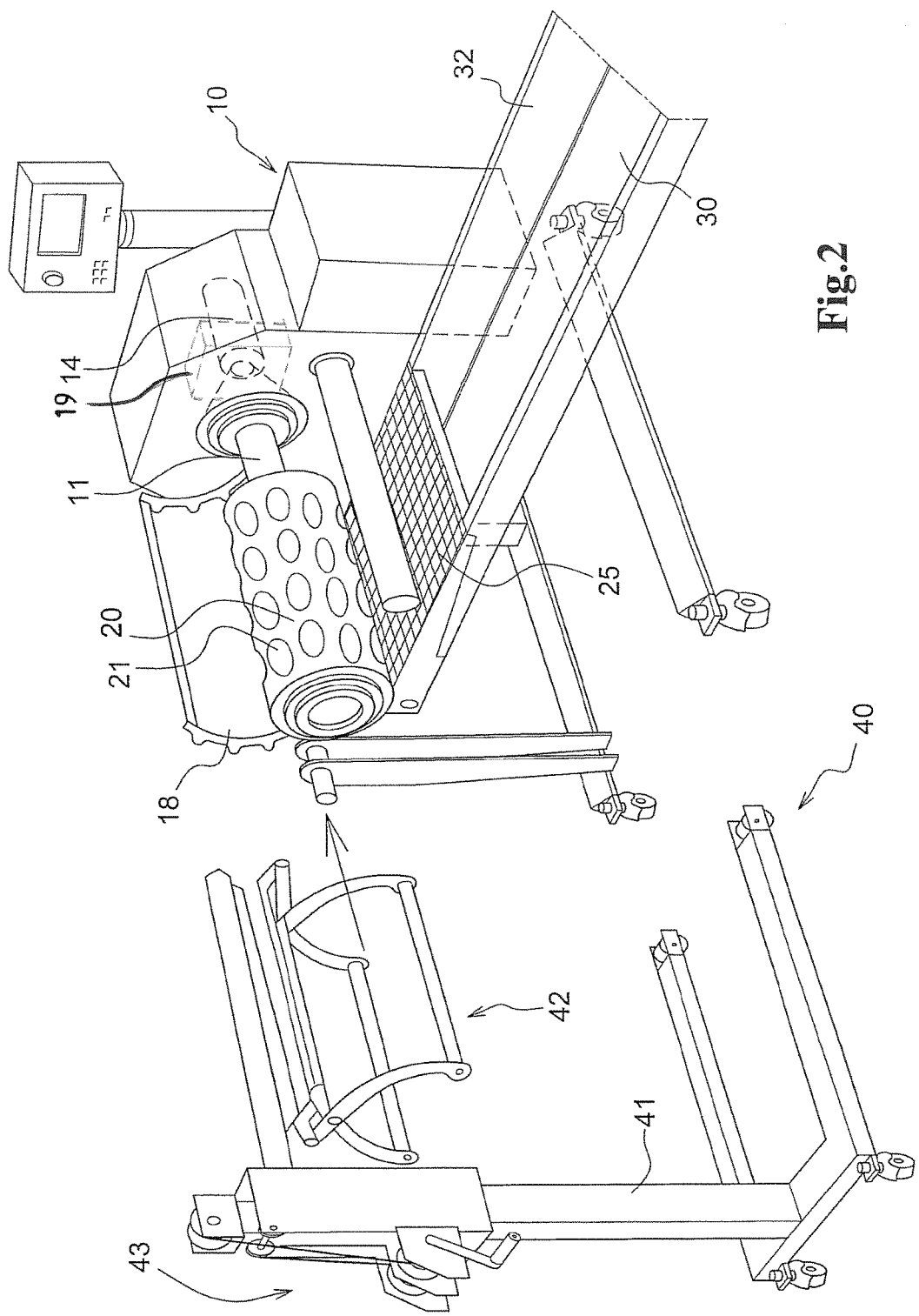

It can be seen from FIG. 2 that after the mass feed member 18 has been moved away from the mould member 20, the conveyor 40 can be moved towards the frame 10, so that the gripper 42 can handle the mould member 20. Then, the gripper 42 is moved to the correct height, so that it bears the weight of the mould member 20 and the mould member 20 is slid off the spindle 11. Then, the mould member 20 can be displaced to a mould member cleaning device 50, which is disposed at a distance from the production device 1. It should be noted that there is no need to provide a fixed arrangement, but rather, as can be seen, the cleaning device 50 is likewise of movable design. However, it is preferable for the cleaning work to be carried out at a different location from the production of foodstuffs.

The shown system further comprises a second cleaning device 60, which is designed to clean that part of the production device 1 which bears the mould member 20, in particular after the said mould member 20 has been removed. That part of the production device 1, after all, also becomes soiled during production.

In the shown system, the production device 1 is furthermore provided with a reader 120 for preferably automatically recognizing a mould member 20, in particular an identification of a mould member 20, e.g. a transponder which is arranged at a suitable location, for example at an head-end face, on the mould member 20. This reader 120 is connected to a control device 130 of the system, which in this case has an associated computer 131. A history of the use and cleaning of the mould member 20 is stored for each mould member 20 in the memory of the computer 131. Partially on this basis, it is possible to determine the instant at which a mould member 20 has to be cleaned, and if appropriate by what cleaning process. For example, the cleaning process can be matched to the type of mould member, and the way in which each mould member is cleaned can be determined separately.

Figure 3:
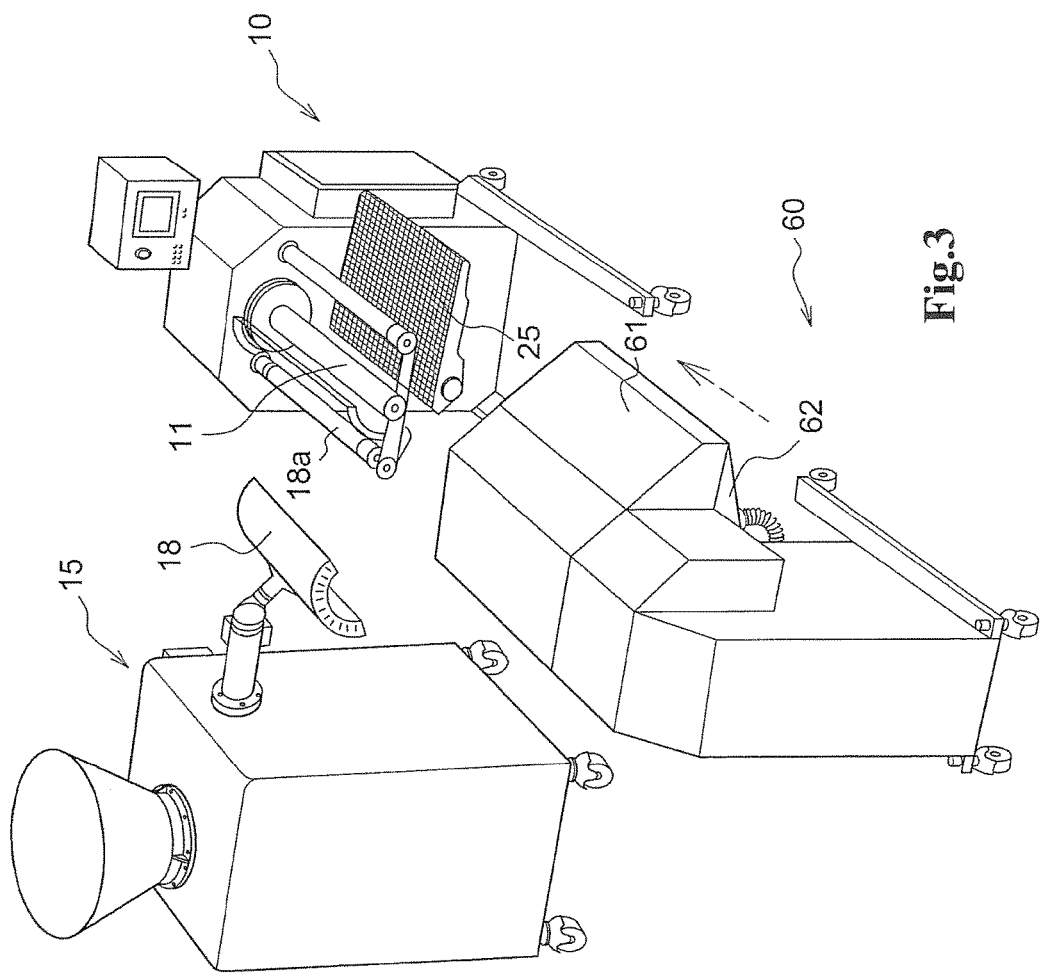
Figure 5:
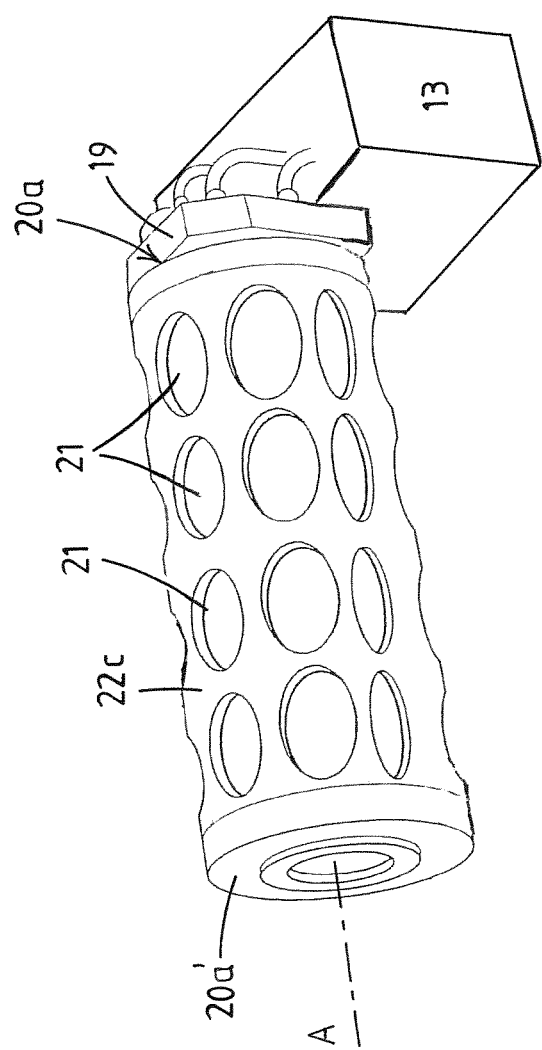

In the embodiment shown in FIGS. 3 and 5, a fluid forcing device 13, suitable for supplying or sucking out a liquid or gaseous forcing agent, such as air, compressed air, water or steam or the like, is arranged in the vicinity of the mould member drive means 14. The shown fluid forcing device 13 which is known per se is provided with a pump and slots through which the forcing agent can flow. A fluid supply member 19 is connected to the fluid forcing device 13, and is adapted to bear against an end face of the mould member 20 from which the one or more fluid channels extend. On account of the fluid supply member 19 being disposed in a static position, the rotating mould member 20 is allowed to alternately move past forcing agent feed slots and forcing agent discharge slots.

In operation of the production device 1 the drive 14 drives the mould member 20 that is supported by the frame 10 so that the one or more openings of the fluid channels in the head end of the mould member pass the fluid supply member 19 and the fluid forcing device 13 forces a fluid via the fluid supply member and the fluid channels into the one or more mould cavities 21, thereby assisting in the removal of the three-dimensional products from the mould cavity.

It can be seen from FIGS. 4a, 5 that the cylindrical mould member 20 adapted to be used in a system as shown in FIGS. 1-3 has a longitudinal axis A, a peripheral cylindrical outer surface 22c and two axial mould member end faces 20a, 20a'.

The shown embodiment of mould member 20 according to the present invention comprises a mould body 22 and support member 23. Mould body 22 is formed as a hollow cylinder wall, having a curved outer surface, here forming the cylindrical outer surface 22c of the mould member 20 and an opposite inner surface 22i (FIG. 4b). The mould body 22 is made at least partially (and in this example completely) from a porous first plastic, forming a porous structure of intercommunicating pores opening out at the inner surface of the body, and wherein the cylindrical outer surface 22c is sealed airtight.

One or more recessed mould cavities 21 are formed in the outer peripheral cylindrical surface 22c of the mould body 22, defining the shape of the products which are to be produced, the mould cavities 21 being open in the outer surface 22c of the mould body 22 to allow for the filling of the mould cavity 21 with said mass of one or more food starting materials and being defined at its bottom and sidewalls by a mould cavity wall 21w that is at least partially porous.

Inside the mould body 22 there is positioned a support member 23, formed by a cylinder, which fits into the hollow cylindrical mould body 22. The support member 23 is made from a non-porous second plastic, and has a support surface 23a (FIG. 4b), supporting the adjoining inner surface 22i of the mould body 22.

The support member 23 and the mould body 22 are secured to each other using a method according to the present invention. In particular, heat emitting parts or particles, here metal rods 28 are provided close to the supporting surface 23a of the mould body. Energy has been provided to the metal rods 28, as a result of which the metal rods 28 emitted heat and thereby locally melted the adjacent porous first plastic of the mould body 22 and the second plastic of the support member. Thus, a weld was obtained and thereby the support member 23 and the mould body 22 were secured to each other.

Support member 23 defines multiple fluid channels 24, recessed in the support surface 23a, extending from a fluid opening 24o at mould member end face 20a, adapted to provide fluid communication between the fluid opening 24o via the fluid channel 24 and via the pores opening out at the inner surface 22i of the mould body 22 to the porous mould cavity wall 21w, so that a fluid can be forced through/from the porous mould cavity wall.

The fluid channels thus extend from one head end 20a of the mould member 20, so that a medium can be forced through the porous walls of the mould cavities 21 and/or suction can take place via a passage 24 of this type. The said medium, for example compressed air, can be used, for example, to release the moulded product from a mould cavity 21. The suction can be used to extract air during the filling operation and/or, for example, to suck a film or the like into the mould cavity.

It can be seen from FIG. 4b that the outer surface 23a of the support member 23 is provided with grooves which extend substantially in the axial direction and form the passages 24. It would also be possible to provide for the mould member to be supported by supporting features at both head-ends of the mould member.

Advantageously, the cleaning device 50 is designed to force at least one cleaning liquid through the wall parts with the porous structure into the mould cavities 21. As can be seen in FIG. 4a, the passages 24 leading to each mould cavity 21 each have a feed opening 24o in an end face 20a of the mould member 20. Advantageously, the cleaning device 50 has a distributor 51 which comes to bear against the head-end face 20a, for the purpose of feeding cleaning liquid to one or more of the passages 24. In this way, any possible contamination which has stuck to or in the porous wall part of a mould cavity 21 is forced out and discharged.

Figure 6B:
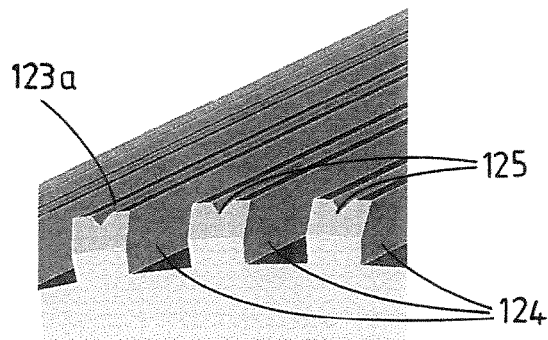
Figure 6A:
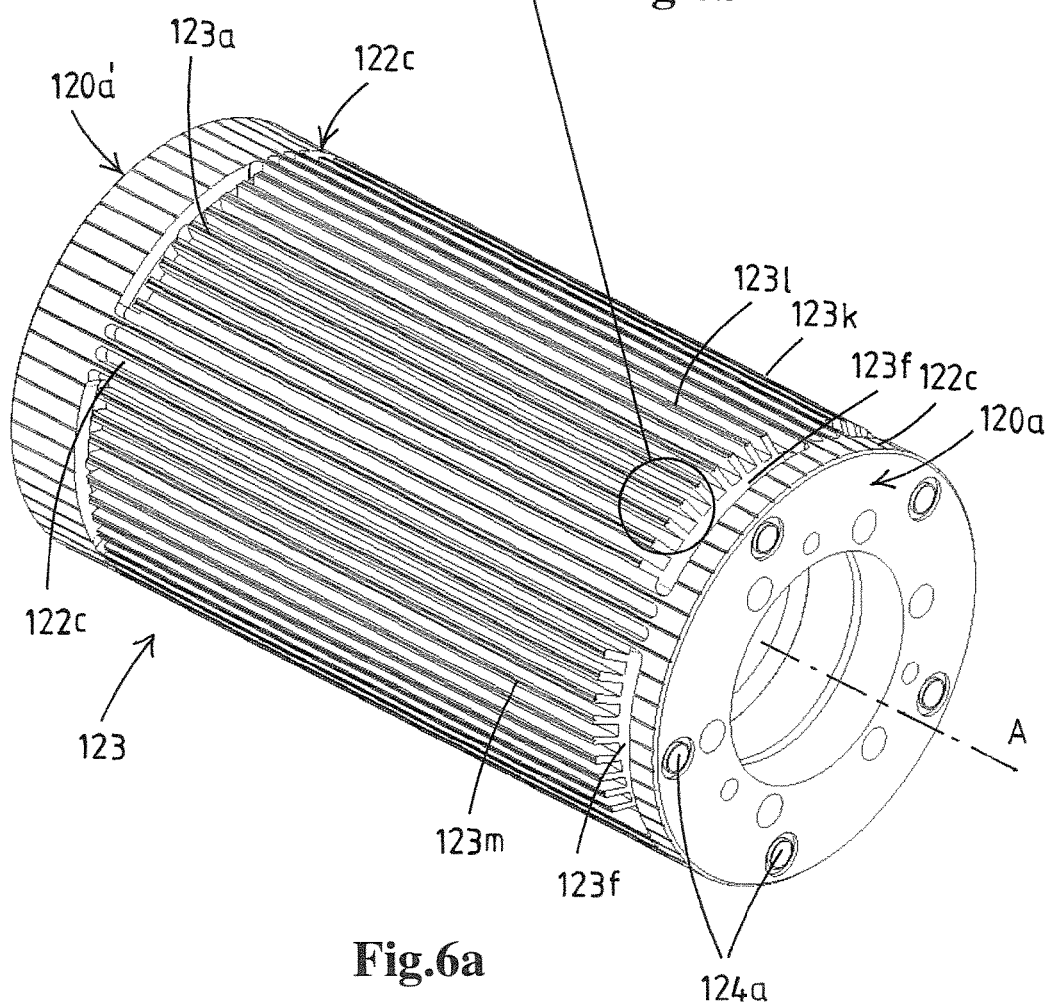

In FIGS. 6a, 6b, a second embodiment of a support member of a mould member according to the present invention is shown. The shown support member is adapted to be connected to a mould body using the inventive method, to form a cylindrical mould member, which is adapted to be used in a system as shown in FIGS. 1-3.

The shown support member 123, formed by a cylinder, is made from a non-porous second plastic. The shown embodiment of support member 123 comprises five similar recesses 123k, 123l, 123m, each having a support surface 123a adapted to support a mould body formed as insert of corresponding dimensions (, not shown), to form a cylindrical mould member. These mould bodies are embodied as axial cylindrical wall segments, or inserts, which are to be inserted in the recessed areas of the support member 123. The support surfaces 123a are only provided in the recesses of the support member. Adjacent the recesses are protruding parts forming the remainder of the cylindrical mould member, comprising parts of the peripheral cylindrical outer surface 122c and two axial mould member end faces 120a, 120a'. Furthermore, the longitudinal axis A of the mould member is defined.

Each mould body, not shown, has a curved outer surface, forming part of the cylindrical outer surface 122c of the mould member. The mould bodies have an opposite inner surface, adapted to be provided adjacent the recessed support surface 123a of the support member. Each mould body, not shown, is made at least partially from a porous first plastic, forming a porous structure of intercommunicating pores opening out at the inner surface of the mould body, and wherein the curved outer surface is sealed airtight. One or more recessed mould cavities are formed in the outer peripheral cylindrical surface of the mould body, defining the shape of the products which are to be produced, the mould cavities being open in the outer surface of the mould body to allow for the filling of the mould cavity with said mass of one or more food starting materials an being defined by a mould cavity wall that is at least partially porous.

In each recessed circumferential area of the support member 123 multiple fluid channels 124 are provided, which are recessed in the support surface 123a. The fluid channels 124 extend to a fluid chamber 123f, which is in communication with a fluid opening 124a at mould member end face 120a. As such, a fluid communication is provided between the fluid opening 24a via the fluid chamber 123f to fluid channel 124. Once supporting a porous mould body insert, a fluid can be forced through/from the porous mould cavity wall via the pores opening out at the inner surface of the mould body and to the porous mould cavity wall. Thus, a medium can be forced through the porous walls of the mould cavities and/or suction can take place via a passage 124 of this type. The said medium, for example compressed air, can be used, for example, to release the moulded product from a mould cavity. The suction can be used to extract air during the filling operation and/or, for example, to suck a film or the like into the mould cavity.

It can be seen from FIG. 6b that the support surface 123a of the support member 123 is provided with grooves 125 which extend substantially in the axial direction. These grooves 125 are adapted to receive metal wires, i.e. the heat emitting parts according to the present invention. Accordingly, the support member 123 and the five mould bodies are adapted to be secured to each other using a method according to the present invention. In particular, energy is provided to the heat emitting parts, here metal wires (not shown) provided in the grooves 125, as a result of which the metal rods 28 emit heat and thereby locally melt the adjacent porous first plastic of the mould body insert (not shown) and the second plastic of the support member 123. Thus, a weld is obtained and thereby the support member 123 and a not shown mould body are secured to each other.

Figure 7:
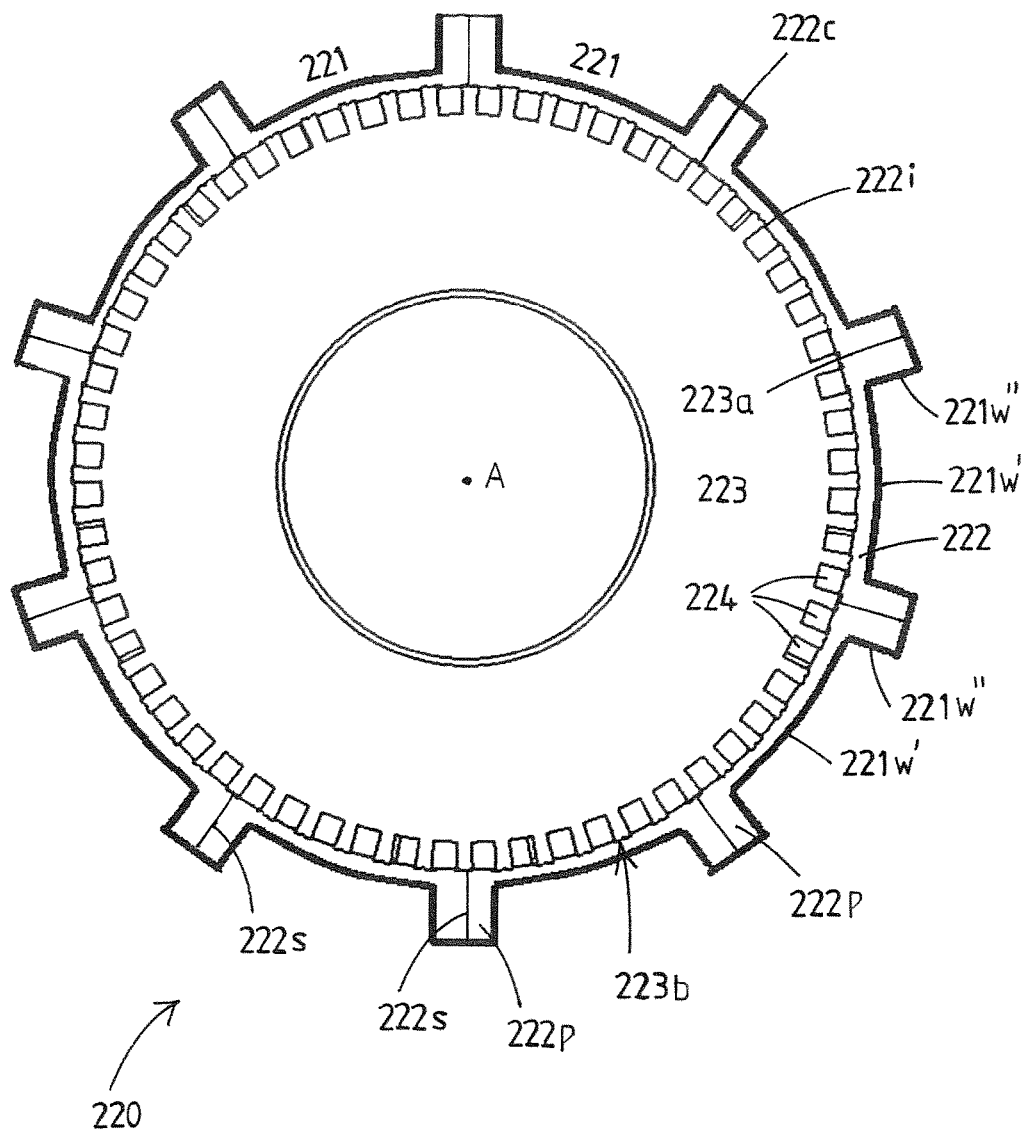

In FIG. 7 a third embodiment of a mould member 220 according to the invention, similar to the first embodiment, is shown in cross-section. Cylindrical mould member 220 is also adapted to be used in a system as shown in FIGS. 1-3. The mould member has a longitudinal axis A, a peripheral cylindrical outer surface 222c and two axial mould member end faces.

This third embodiment of mould member 220 according to the present invention comprises a mould body 222 and support member 223. Mould body 222 is formed as a hollow cylinder wall, having a curved outer surface, here forming the cylindrical outer surface 222c of the mould member 220 and an opposite inner surface 222i. The mould body 222 is made at least partially from a porous first plastic, forming a porous structure of intercommunicating pores opening out at the inner surface of the body, and wherein the cylindrical outer surface 222c is sealed airtight.

One or more recessed mould cavities 221, here 10 cavities in the circumferential direction, are formed in the outer peripheral cylindrical surface 222c of the mould body 222, defining the shape of the products which are to be produced. Between the mould cavities 221 portions 222p of the mould body protrude. The mould cavities 221 are open in the outer surface 222c of the mould body 222 to allow for the filling of the mould cavity 221 with said mass of one or more food starting materials and being defined at its bottom 221w' and sidewalls 221w''' by a mould cavity wall 221w', 221w''' that is at least partially porous.

Advantageously, the entire mould body 222 is made porous. Prior or after assembly to the support member, the outer surface 222c of the mould body is sealed off, and radially extending fluid tight barriers 222s are formed between the mould cavities 221, in the protrusions 222p of the mould body 222, between the curved outer surface 222c and the opposite inner surface 222i. As a result, multiple fluid tight regions are formed in the mould body 222 in which one or more mould cavities are provided As such, the cavity (or longitudinal row of cavities) is formed in an airtight compartment of the mould body.

Inside the mould body 222 there is positioned a support member 223, formed by a cylinder, which fits into the hollow cylindrical mould body 222. The support member 223 is made from a non-porous second plastic, and has a support surface 223a, supporting the adjoining inner surface 222i of the mould body 222.

The support member 223 and the mould body 222 are secured to each other using a method according to the present invention. In particular, heat emitting parts or particles, here metal wires are provided in grooves 223b in the supporting surface 223a of the mould body 223. Energy has been provided to the metal wires, as a result of which the metal wires emitted heat and thereby locally melted the adjacent porous first plastic of the mould body 222 and the second plastic of the support member 223. Thus, a weld was obtained and thereby the support member 223 and the mould body 222 were secured to each other. It can be discerned that in the shown embodiment, five metal wires are provided below each mould cavity to obtain an appropriate connection.

Support member 223 defines multiple fluid channels 224, here five below each mould cavity 221, which are recessed in the support surface 223a, and extend from a fluid opening at a mould member end face to provide fluid communication between the fluid opening via the fluid channel 224 and via pores opening out at the inner surface 222i of the mould body 222 to the porous mould cavity wall 221w', 221w''', so that a fluid can be forced through/from the porous mould cavity wall.

Figure 8A:
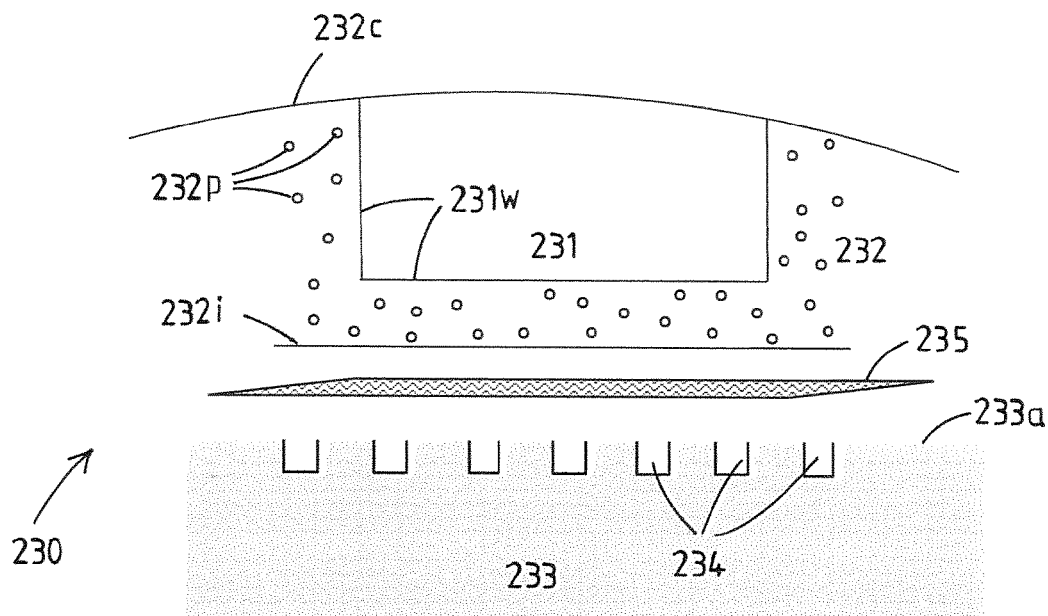
FIG. 8b shows in cross-section a portion of a fifth embodiment of a cylindrical mould member, prior to assembly of the mould body and support member.
Figure 8B:
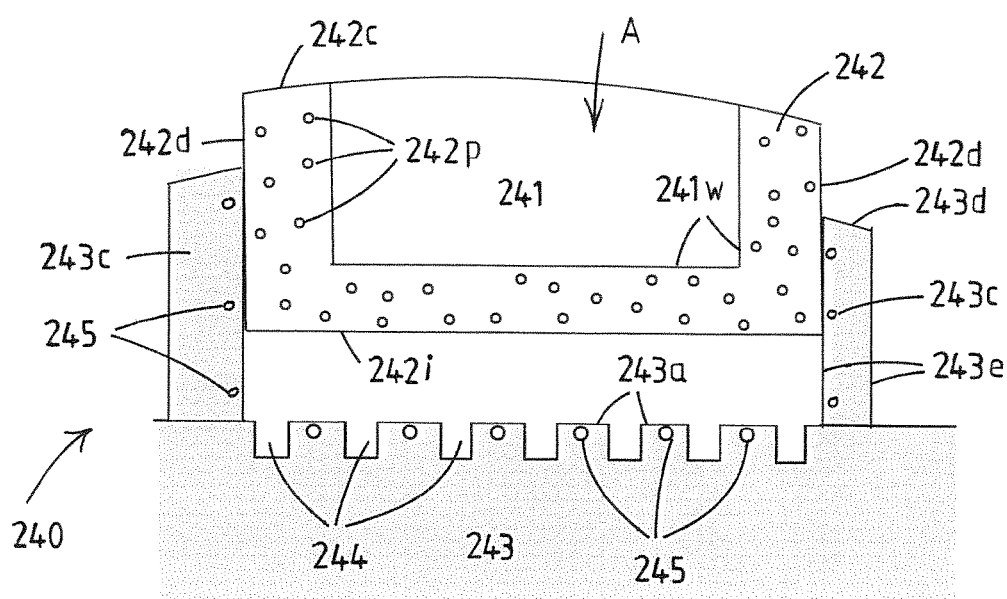

In FIGS. 8a and 8b very schematically, in cross-section, portions of a fourth and fifth embodiment of a cylindrical mould member 230, 240 is shown, prior to assembly of the mould body and support member.

Mould member 230 as shown in FIG. 8a comprises a mould body 232 and a support member 233. Only part of the mould body 232 is shown, which may either be part of a one-piece cylindrical wall, or part of an insert. The mould body 232 has a cylindrical outer surface 232c, forming part of the cylindrical outer surface 232c of the mould member 230 and an opposite inner surface 232i, which mould body 232 is made at least partially from a porous first plastic, forming a porous structure of intercommunicating pores 232p opening out at the inner surface 22i of the mould body 22, and wherein the curved outer surface 232c is sealed airtight. A recessed mould cavity 231 is formed in the outer peripheral cylindrical surface 232c of the mould body, defining the shape of the products which are to be produced. The mould cavity 231 is open in the outer surface 232c of the mould body 232 to allow for the filling of the mould cavity 231 with said mass of one or more food starting materials. The mould cavity 231 is defined by a mould cavity wall 231w that is at least partially porous.

Support member 233 is made from a non-porous second plastic and has a support surface 233a. The support member defines 233 multiple fluid channels 234, recessed in the support surface 233a, here five channels below one cavity 231 and two channels at the sides. All fluid channels 234 extend from a fluid opening at a mould member end face to provide fluid communication between the fluid opening via all fluid channels 234 and via the pores 232p opening out at the inner surface 232i of the mould body 232 to the porous mould cavity wall 231w.

The support surface 233a of the support member 233 is provided adjacent the inner surface 231i of the mould body 232. Between these surfaces 233a, 231i a wire screen 235 is provided. The support member 232 and mould body 233 may be brought together, and even pressed together, after which energy is provided to the wire screen 235, thereby causing the wire screen 235 to emit heat and thereby locally melt the adjacent porous first plastic and the second plastic to obtain a weld and thereby secure the support member 233 and the mould body 232 to each other.

In FIG. 8b a portion of a mould member 240 is shown, also prior to the assembly of mould body 242 and support member 243. The mould member comprises multiple mould bodies, only one of which is shown. Mould body 242 is to be inserted into the support member 243 in the direction of arrow A. The mould body 242 has a curved outer surface 242c, forming at least part of the cylindrical outer surface of the mould member, an opposite inner surface 242i and side surfaces 242d between the curved outer surface 242c and inner surface 242i. The mould body 242 is made at least partially from a porous first plastic, forming a porous structure of intercommunicating pores 242p opening out at the inner surface 242i of the mould body 242, and wherein the curved outer surface 242c is sealed airtight.

A recessed mould cavity 241 is formed in the outer peripheral cylindrical surface 242c of the mould body, defining the shape of the products which are to be produced. The mould cavity is open in the outer surface 242c of the mould body 242 to allow for the filling of the mould cavity 241 with said mass of one or more food starting materials. The mould cavity is defined by a mould cavity wall 241w that is at least partially porous.

In the shown embodiment, the support member 243, made from a non-porous second plastic, has a support surface 243a and multiple, preferably radially extending, protruding support fins 243c, two of which are shown. The support fins have a curved surface 243d that forms part of the cylindrical outer surface of the mould member and adjacent flank surfaces 243e. The flank surfaces 243e of the support fins 243c are provided adjacent side surfaces 242d of the mould body 242, once the support surface 243a of the support member 243 is provided adjacent the inner surface 242i of the mould body 242.

The support member 243 defines fluid channels 244, recessed in the support surface 243a, extending from a fluid opening at a mould member end face, which are adapted to provide fluid communication between the fluid opening via the fluid channel and via the pores opening out at the inner surface of the mould body to the porous mould cavity wall.

Close to the supporting surface 243a of the support member 243, and close to the flank surface 243e of the fin 243c of the support member 243 are provided hollow tubes 245. These hollow tubes 245 are adapted to allow a heated fluid, e.g. gas to pass, and thereby energy is provided resulting in the emission of heat by the hollow tubes and thereby locally melt the adjacent porous first plastic and the second plastic to obtain a weld and thereby secure the support member and the mould body to each other. The provision of heat emitting tubes adjacent the flank surfaces ensures an improved securement of the mould body to the support member.

Figure 9:
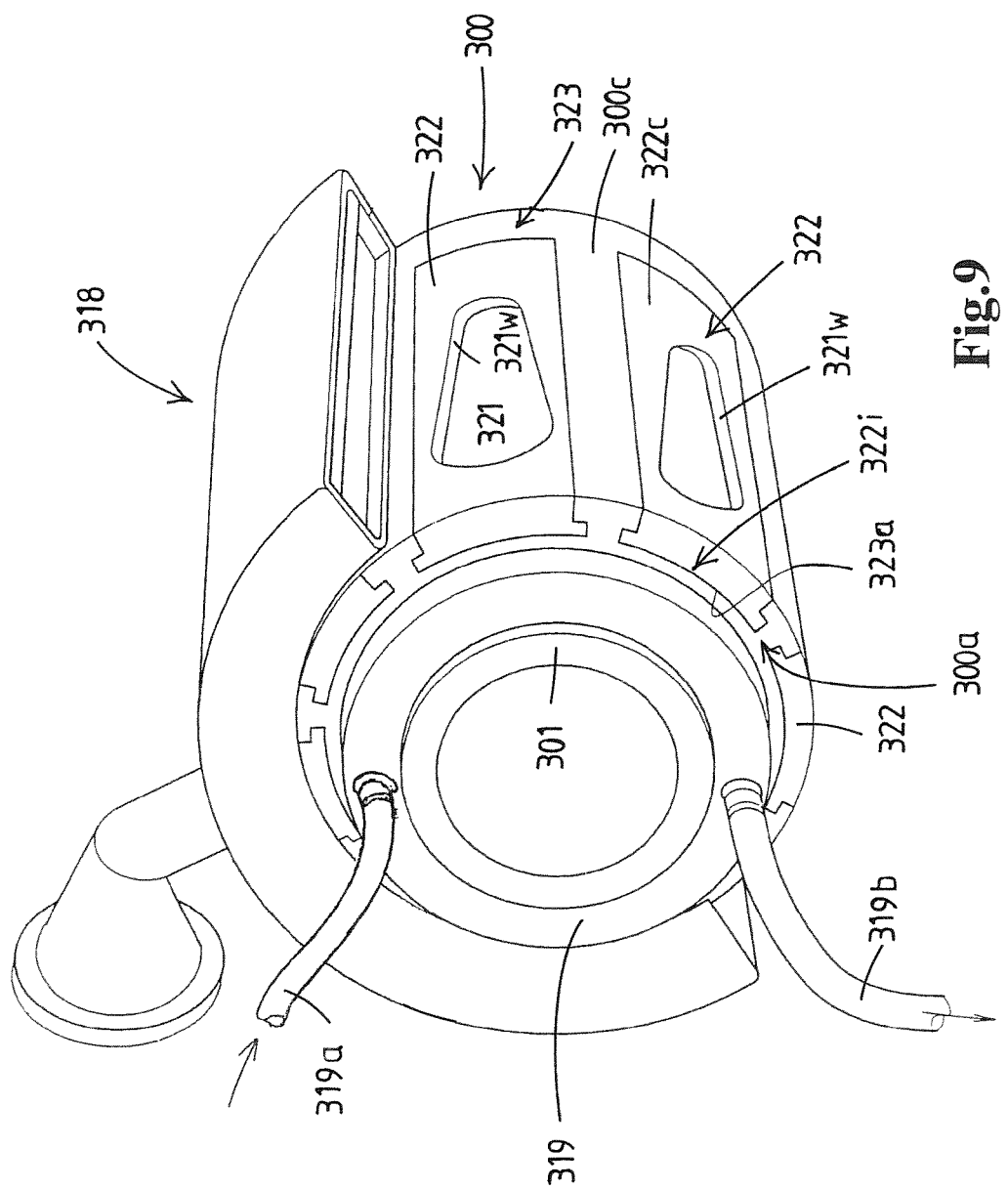
FIG. 9 shows in a perspective view of portion of a production device with a sixth embodiment of a mould member.

In FIG. 9 a sixth embodiment of a mould member 300 is shown, with a portion of a production device in a perspective view. In particular, a portion of frame 301 is visible that supports the mould member 300. Furthermore a mass feed member 318 is shown, that is connected to a pump, wherein the mass feed member 318 bears against a peripheral cylindrical outer surface 300c of the mould member 300. Part of a fluid supply member 319 is visible, bearing against an end face 300a of the mould member 300, here comprising a hose 319a to supply fluid and a hose 3219b to expel fluid.

The cylindrical mould member 300 has a support member 323, made from a non-porous second plastic, which support member has a support surface 323a. Not visible are fluid channels, defined by the support member, which are recessed in the support surface 323a, extending from a fluid opening at a mould member end face 300a, adapted to provide fluid communication between the fluid opening via the fluid channels.

The cylindrical mould member 300 further comprises eight mould bodies 322, three of which are visible, having a curved outer surface 322c, forming at part of the cylindrical outer surface 322c of the mould member, and an opposite inner surface 322i. Mould body 322 is made at least partially from a porous first plastic, forming a porous structure of intercommunicating pores opening out at the inner surface 322i of the mould body 322. The curved outer surface 22c is sealed airtight. In the shown embodiment, in each mould body 322 one recessed mould cavities 321 is formed in the outer peripheral cylindrical surface 322c of the mould body, defining the shape of the products which are to be produced, the mould cavities being open in the outer surface 322c of the mould body 322 to allow for the filling of the mould cavity 321 with said mass of one or more food starting materials and being defined by a mould cavity wall 321w that is at least partially porous. A fluid communication is provided between the fluid opening via the fluid channels and via pores opening out at the inner surface of a mould body to the porous mould cavity wall 321w.

To form the mould member, the support surface 323a of the support member is positioned adjacent the inner surface 322i of the mould body. Not visible, but according to the invention,
heat emitting parts or particles have been provided close to the inner surface 322i of the mould body 322 and/or the supporting surface 323a of the support member 323. Energy has been provided to these heat emitting parts or particles, whereby heat emission of these parts or particles is caused and locally melting of the adjacent porous first plastic and the second plastic, as a result of which a weld is obtained and thereby the support member 323 and the mould body 322 are secured to each other. In addition to this weld, the mould body is also secured to the support surface via a form-fit, as visible at the end face.

Figure 10A:
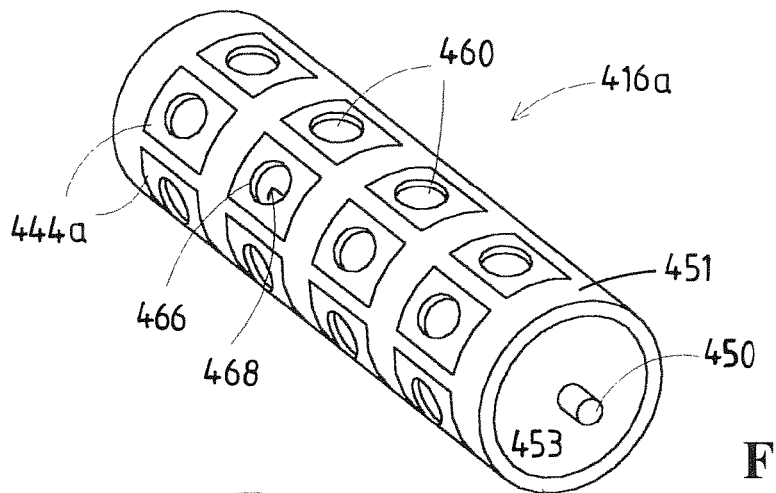
FIGS. 10a-10c show in a perspective view a seventh, eighth and ninth embodiment of a cylindrical mould member, after assembly of the mould body and support member.
Figure 10B:
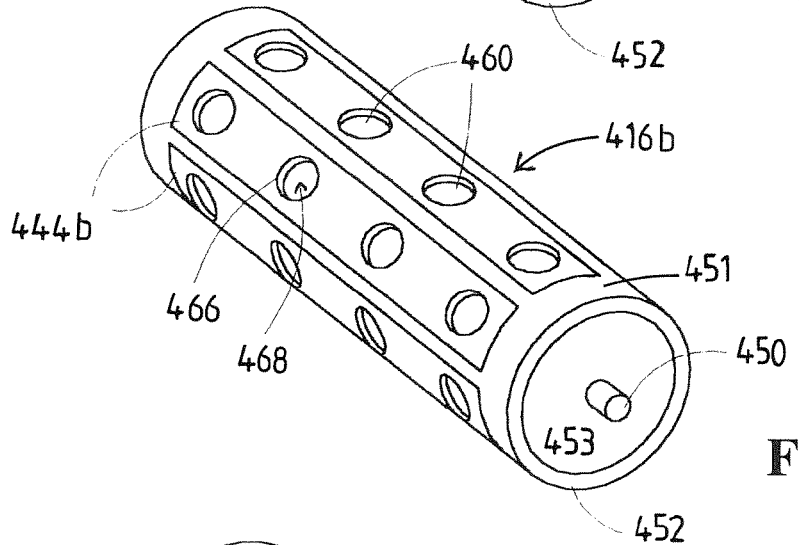
Figure 10C:
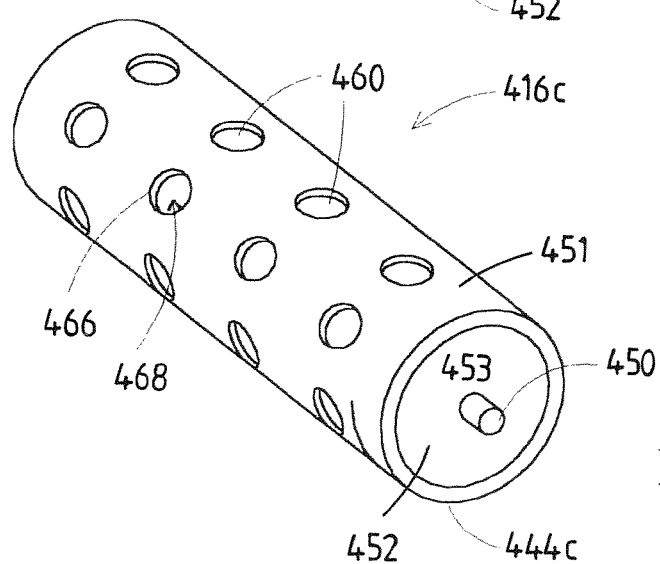

In FIGS. 10a-10c a seventh, eighth and ninth embodiment of a cylindrical mould member 416a, 416b and 416c respectively are shown, after assembly of the mould body and support member.

Each of the mould members 416a, 416b, 416c has a longitudinal axis 450, a peripheral cylindrical outer surface 451 and two axial mould member end faces 453. The mould members 416a, 416b, 416c comprise a support member 452 made from a non-porous second plastic, which support member has a support surface (not visible), which is positioned adjacent an inner surface (also not visible) of a mould body 444a, 444b,444c respectively.

All mould bodies 444a, 444b,444c are made at least partially from a porous first plastic, forming a porous structure of intercommunicating pores opening out at the inner surface of the mould body, and all have a curved outer surface, which is sealed airtight. One or more recessed mould cavities 460 are formed in the outer peripheral cylindrical surface 451 of the mould body, defining the shape of the products which are to be produced. The mould cavities 460 are open in the outer surface of the mould body to allow for the filling of the mould cavity with said mass of one or more food starting materials. The mould cavities are defined by a mould cavity wall that is at least partially porous, in particular a circumferential wall 466 and a base wall 468.

In the embodiment of FIG. 10a, the support member 452 is provided with six rows of four essentially square recesses, three rows of which are visible, and the mould bodies 444a are formed as inserts of corresponding dimensions, here as cylindrical wall segments. The outer surface of each of the mould bodies 444a forms part of the cylindrical outer surface 451 of the mould member. In each mould body 444a a single recessed mould cavities 460 is formed in the outer peripheral cylindrical surface of the mould body.

In the embodiment of FIG. 10b, the support member 452 is provided with six rectangular recesses, three of which are visible, and the mould bodies 444a are formed as inserts of corresponding dimensions, here as cylindrical wall segments. The outer surface of each of the mould bodies 444b forms part of the cylindrical outer surface 451 of the mould member. In each mould body 444b four recessed mould cavities 460 are formed in the outer peripheral cylindrical surface of the mould body.

In the embodiment of FIG. 10c, similar to the embodiment of FIGS. 4a, 4b, mould body 444c is formed as a hollow cylinder wall, and the support member 452 is formed by a cylinder fitting into this hollow cylinder wall. The outer surface of each of the cylindrical mould body forms the cylindrical outer surface 451 of the mould member. Six rows of four recessed mould cavities 460 are formed in the outer peripheral cylindrical surface of the mould body 444c.

According to the invention, heat emitting parts or particles (not visible) have been provided close to the inner surface of the mould body 444a, 444b,444c and/or the supporting surface of the support member 452. Energy has been provided to these heat emitting parts or particles, whereby heat emission of these parts or particles is caused and locally melting of the adjacent porous first plastic and the second plastic, as a result of which a weld is obtained and thereby the support member 452 and the mould body 444a, 444b,444c are secured to each other.

Not visible are fluid channels, defined by the support member, which are recessed in the support surface, extending from a fluid opening at a mould member end face 453, adapted to provide fluid communication between the fluid opening via the fluid channels A fluid communication is provided between the fluid opening via the fluid channels and via pores opening out at the inner surface of a mould body to the porous mould cavity wall 466, 468.

The invention claimed is:

1. A method for producing a rotary cylindrical mould member, which is adapted to be used in a system for moulding three-dimensional products from a mass of one or more food starting materials which are suitable for consumption, the cylindrical mould member having a longitudinal axis, a peripheral cylindrical outer surface and two axial mould member end faces, the method comprising the steps of:

preparing at least one mould body having a curved outer surface, forming at least part of the cylindrical outer surface of the mould member and an opposite inner surface, which mould body is made at least partially from a porous first plastic, forming a porous structure of intercommunicating pores opening out at the inner surface of the mould body, wherein the curved outer surface is sealed airtight, and wherein one or more recessed mould cavities are formed in the outer peripheral cylindrical surface of the mould body, defining the shape of the products which are to be produced, the mould cavities being open in the outer surface of the mould body to allow for the filling of the mould cavity with said mass of one or more food starting materials and being defined by a mould cavity wall that is at least partially porous; and preparing a support member made from a non-porous second plastic, wherein the support member has a support surface, and wherein the support member defines one or more fluid channels, recessed in the support surface, extending from a fluid opening at a mould member end face, adapted to provide fluid communication between the fluid opening via the fluid channel and via the pores opening out at the inner surface of the mould body to the porous mould cavity wall;

providing the support surface of the support member adjacent the inner surface of the mould body;

providing heat emitting parts or particles close to the inner surface of the mould body and/or the supporting surface of the support member; and providing energy to the heat emitting parts or particles, thereby causing the parts or particles to emit heat and thereby locally melt the adjacent porous first plastic and the second plastic to obtain a weld and thereby secure the support member and the mould body to each other.

2. The method according to claim 1, wherein the heat emitting parts are metal strips or wires, provided at or near the support surface of the support member.

3. The method according to claim 2, wherein the support surface is provided with grooves to receive the metal strips or wires.

4. The method according to claim 1, wherein the heat emitting part is a porous film/braid/mesh/wire screen, provided between the inner surface of the mould body and the supporting surface of the support member.

5. The method according to claim 1, wherein energy is provided to the heat emitting part or particles by applying electromagnetic radiation to heat the heat emitting parts or particles.

6. The method according to claim 1, wherein energy is provided to the heat emitting part or particles by allowing electrical current to pass through the heat emitting parts or particles.

7. The method according to claim 1, wherein energy is provided to the heat emitting part or particles by allowing Eddy currents to pass through the heat emitting parts or particles, thereby causing induction heating.

8. The method according to claim 1, wherein the mould body is formed as a hollow cylinder wall, and wherein the support member is formed by a cylinder fitting into the hollow cylinder wall.

9. The method according to claim 1, wherein the support member is provided with one or more recesses, and the mould bodies are formed as inserts of corresponding dimensions.

10. The method according to claim 9, wherein the support member comprises one or more protruding support fins, having a curved surface that forms part of the cylindrical outer surface of the mould member and adjacent flank surfaces, and wherein multiple mould bodies are provided comprising a side surface between the curved outer surface and the inner surface, wherein a flank surface of the support fin is adapted to be provided adjacent a side surface of a mould body when the support surface of the support member is provided adjacent the inner surface of the mould body.

11. The method according to claim 1, wherein the mould body comprises multiple recessed mould cavities, and wherein fluid tight barriers are provided between each mould cavity or set of mould cavities, which fluid tight barriers extend between the curved outer surface and the opposite inner surface, creating one or more fluid tight regions in the mould body in which one or more mould cavities are provided.

12. The method according to claim 1, wherein at least the mould body, is prepared by a 3D printing technique.

13. The method according to claim 1, wherein at least the mould body, is prepared by sintering powder.

14. The method according to claim 2, wherein energy is provided to the heat emitting part or particles by applying electromagnetic radiation to heat the heat emitting parts or particles.

15. The method according to claim 3, wherein energy is provided to the heat emitting part or particles by applying electromagnetic radiation to heat the heat emitting parts or particles.

16. The method according to claim 4, wherein energy is provided to the heat emitting part or particles by applying electromagnetic radiation to heat the heat emitting parts or particles.

17. The method according to claim 2, wherein energy is provided to the heat emitting part or particles by allowing electrical current to pass through the heat emitting parts or particles.

18. The method according to claim 3, wherein energy is provided to the heat emitting part or particles by allowing electrical current to pass through the heat emitting parts or particles.

19. A cylindrical mould member adapted to be used in a system for moulding three-dimensional products from a mass of one or more food starting materials which are suitable for consumption, the cylindrical mould member having a longitudinal axis, a peripheral cylindrical outer surface and two axial mould member end faces, the mould member comprising:
 at least one mould body having a curved outer surface, forming at least part of the cylindrical outer surface of the mould member and an opposite inner surface, which mould body is made at least partially from a porous first plastic, forming a porous structure of intercommunicating pores opening out at the inner surface of the body, wherein the curved outer surface of the mould body is sealed airtight, and wherein one or more recessed mould cavities are formed in the outer peripheral cylindrical surface of the mould body, defining the shape of the products which are to be produced, the mould cavities being open in the outer surface of the mould body to allow for the filling of the mould cavity with said mass of one or more food starting materials and being defined by a mould cavity wall that is at least partially porous; and
 a support member made from a non-porous second plastic, which support member has a support surface, which support member defines one or more fluid channels, recessed in the support surface, extending from a fluid opening at a mould member end face, adapted to provide fluid communication between the fluid opening via the fluid channel and via the pores opening out at the inner surface of the mould body to the porous mould cavity wall,
 wherein the support member and the mould body are secured to each other using the method according to claim 1.

20. A system for moulding three-dimensional products from a mass of one or more food starting materials which are suitable for consumption, which system comprises:
 the cylindrical mould member according to claim 19; and
 a production device comprising:
  a frame that is adapted to support the mould member;
  a drive for driving the mould member that is supported by the frame;
  a container for receiving said mass of one or more food starting materials;
  a pump connected to the container;
  a mass feed member connected to the pump, wherein the mass feed member is adapted to bear against the cylindrical outer surface of the mould member;
  a fluid forcing device; and
  a fluid supply member connected to the fluid forcing device, wherein the fluid supply member is adapted to bear against the end face of the mould member from which the one or more fluid channels extend.

\* \* \* \* \*